March 29, 1960   J. G. IMPARATO   2,930,091
CLAMP UNITS
Filed July 25, 1958
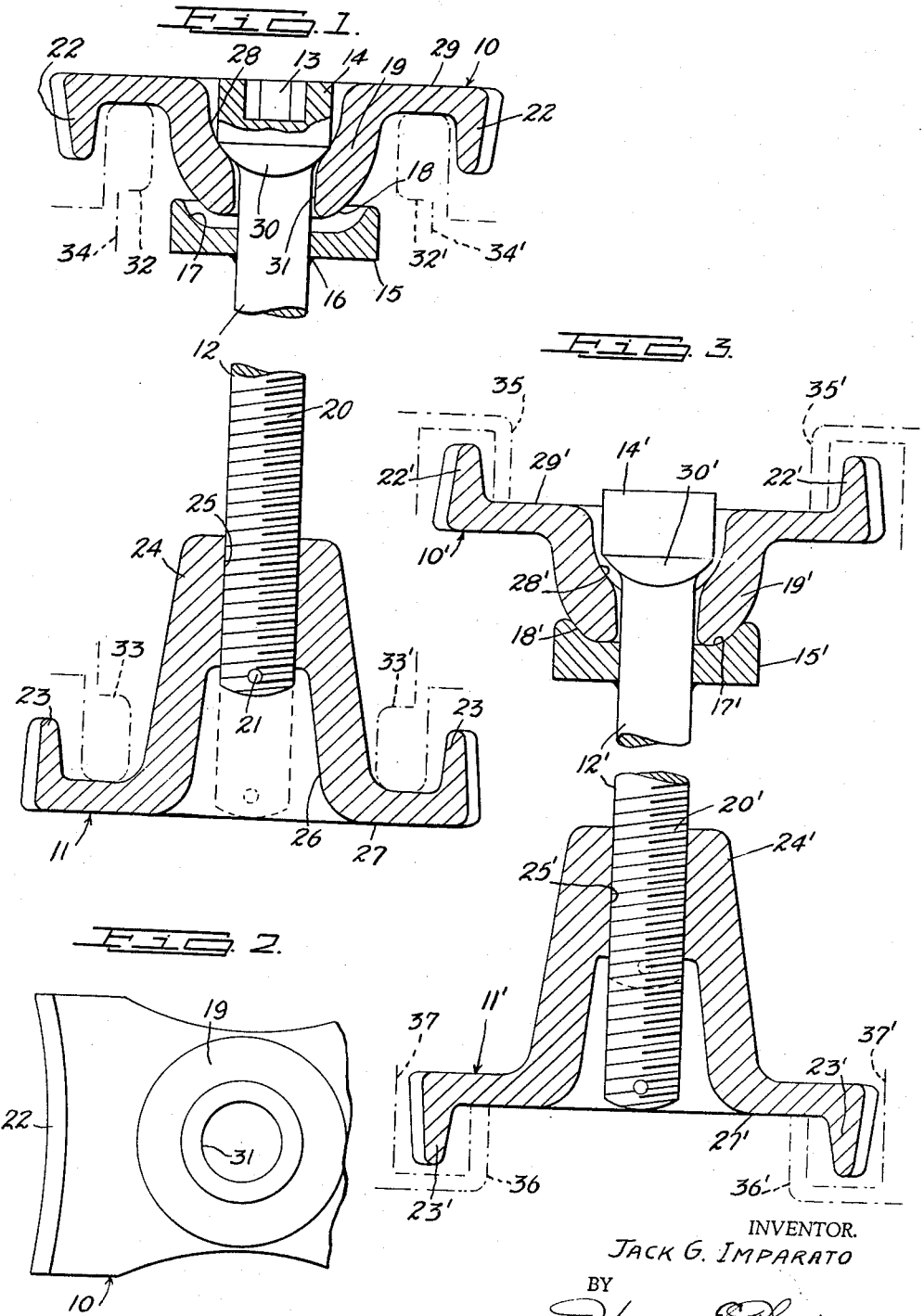
INVENTOR.
JACK G. IMPARATO
BY
Howard E. Thompson
ATTORNEY United States Patent Office 2,930,091
Patented Mar. 29, 1960

2,930,091

CLAMP UNITS

Jack G. Imparato, Brooklyn, N.Y.

Application July 25, 1958, Serial No. 751,071

2 Claims. (Cl. 24—73)

This invention relates to a clamp unit comprising two plates with a single operating element for adjustably coupling the plates in establishing engagement with a pair of articles to be coupled by the unit. More particularly, the invention deals with a clamp unit of the character described, wherein the plates are what might be said to be deep-drawn to form a long threaded bearing portion in one plate and a socket in the other plate for reception of the head of the bolt or other coupling element employed.

The novel features of the invention will be best understood from the following description, when taken together with the accompanying drawing, in which the separate parts are designated by suitable reference characters in each of the views and, in which:

Fig. 1 is a broken sectional view through a clamp unit made according to my invention, part of the construction being shown in elevation and indicating, in dot-dash lines, portions of two supports to be coupled by the clamp unit.

Fig. 2 is a bottom plan view of a part of one of the plates of the unit shown in Fig. 1 detached; and Fig. 3 is a view, similar to Fig. 1, showing a modification and indicating, in dot-dash lines, parts of two supports engaged by the unit.

Considering Figs. 1 and 2 of the drawing, my improved clamp unit comprises what may be termed a top plate 10 and bottom plate 11, these plates being adjustably coupled by an Allen-type bolt 12, having the socket 13 in the head 14 thereof. After mounting the plate 10 on the bolt and positioning the same adjacent the head 14, a recessed collar 15 is welded to the bolt, as at 16, the recess 17 of the collar generally conforming to the contour of the outer lower surface 18 of a deep-drawn bearing or socket portion 19 centrally of the plate 10.

The lower end portion of the bolt or element 12 is threaded, as seen at 20, and the end portion of the element 12 has an aperture for reception of a cotterpin or the like 21 to retain the clamp plate 11 against displacement from said end of the bolt 12.

Both plates 10 and 11 are generally of the same peripheral contour and, in Fig. 2 of the drawing, part of the plate 10 is shown to illustrate the curvature of the side flanges 22 of the plate 10, it being understood that the flanges 23 of the plate 11 are of the same general contour.

The plate 11 also includes a deep-drawn cylindrical bearing portion 24, which includes a reasonably long threaded bore 25 for engagement with the threaded end 20 of the bolt 12. In other words, the threaded portion forms, of the body 24, a nut-like member movable along the bolt 12 in adjusting positions of the plates 10 and 11 one with respect to the other. The plate, beyond the threaded portion 25, includes a socket 26 opening through the surface 27 of the plate 11. It will be apparent that the flanges 22—23, in combination with the portions 19, 24, respectively, form channels on surfaces of the plates which open through ends of the plates.

The deep-draw 19 of the plate 10 also forms a socket 28 opening through the surface 29 of the pate, the lower portion of the socket being rounded to form a seat for the lower rounded portion 30 of the head 14. A bore 31 is formed in the deep-drawn bearing portion 19 which is considerably larger in diameter than the diameter of the bolt 12, so as to provide rocking movement of the plate 10 in adjustment of the plate to fit slight variances in overall dimensions of a pair of articles or products engaged and coupled by the clamp unit.

In Fig. 1 of the drawing, upper and lower flange or rim portions are indicated in dot-dash lines at 32, 32'; 33, 33', respectively, of what could be two drums 34, 34', which would be coupled by the clamp unit, the showing of the drum structure being purely diagrammatic.

In Fig. 3 of the drawing, I have shown a slight modification of the structure shown in Fig. 1, wherein 10' and 11' illustrate two plates, generally similar to the plates 10 and 11, with the exception that the flanges 22' and 23' extend outwardly beyond the surfaces 29' and 27', respectively, rather than inwardly, as noted in Fig. 1. The only other difference in the construction resides in the fact that the collar 15' is made of greater thickness than the collar 15 and the recess 17' is made to accurately conform with the rounded surface 18' of the bearing portion 19'. In Fig. 3, 12' represents the bolt or coupling element, 14' the head of the bolt and 20' the threaded portion engaging the threaded bore 25' of the nut-like bearing portion 24'.

In Fig. 3 of the drawing, I have indicated diagrammatically in dot-dash lines what might be termed upper and lower inturned flanges 35, 35'; 36, 36' of two generally similar cylinder or other products 37, 37'. With the structure of Fig. 1 of the drawing, the plates 10 and 11 are drawn together by the bolt 12 in engaging the products; whereas, in Fig. 3 of the drawing, the plates 10', 11' are moved away from each other in engaging the products and, in this operation, the collar 15' urges the plate 10' in engagement with the products, thus the rounded surface 30' of the bolt head 14' will move away from the rounded seat 28' of the plate 10', as diagrammatically illustrated in the drawing.

From the foregoing, it will be apparent that clamping engagement with pairs of generally similar products can be accomplished by the drawing of the plates together, or the spreading of plates and, in both instances, sufficient length of thread is provided, as at 20, 20', on the elements 12, 12', to permit engagement of the flanges 22, 23; 22', 23' with the products and also sufficiently long to provide a reasonable relative adjustment of the plates in engaging products of different spacings between the ends thereof and, of course, caring for slight variances in products which are substantially of the same length. In other words, a single clamp may be used for engagement of products which vary in length to the extent of an inch or two, but different units would be provided to care for engagement of products which vary materially in overall length. In this connection, it will be apparent that the only difference would be in the length of the bolt or element 12, 12' employed.

Considering the structure shown in Fig. 1 of the drawing, it will be apparent that, when coupling engagement has been established with two products, the bolt, in its entirety, is housed within the sockets 26 and 28, so as to leave outer surfaces 27 and 29 of the plates 11 and 10 clear and unobstructed. This is desirable, particularly, where the products are stacked. It will be apparent that a more or less standard-type of Allen wrench would be used in rotation of the bolt or element 12, 12' in the operation of coupling and uncoupling the units with the pairs of products. By locating the heads 14, 14' at the upper ends of the products, this operation becomes accessible at all times, whether the products are arranged in an upright position or are laid down horizontally, in which latter case the surface 29 would be at one side of the products.

Having fully described my invention, what I claim as new and desire to secure by Letters Patent is:

1. A clamp unit comprising a pair of clamp plates, a bolt-like element having a shank with a rounded part at one end, said element adjustably coupling said plates, at least one plate having flanges defining opposed sides of the plate, said flanges having convexly curved inner surfaces, said flanges being arranged at right angles to one surface of the plate, a central cylindrical bearing socket integral with said one plate and engaged by said rounded part on said element, said socket having a bore greater in diameter than the diameter of said shank of the element arranged therein, said one plate intermediate the flanges and around the bearing socket having flat article engaging surfaces lying in a common plane, and said surfaces, in combination with the flanges and bearing socket, forming channels substantially parallel to said flanges.

2. A clamp unit comprising a pair of clamp plates, a bolt-like element having a shank with a rounded part at one end, said element adjustably coupling said plates, at least one plate having flanges defining opposed sides of the plate, said flanges having convexly curved inner surfaces, said flanges being arranged at right angles to one surface of the plate, a central cylindrical bearing socket integral with said one plate and engaged by said rounded part on said element, said socket having a bore greater in diameter than the diameter of said shank of the element arranged therein, said one plate intermediate the flanges and around the bearing socket having flat article engaging surfaces lying in a common plane, said surfaces, in combination with the flanges and bearing socket, forming channels substantially parallel to said flanges, the shank of said element having means at the other end thereof operatively engaging the other of said plates in movement of the plates into operative engagement with predetermined articles, and means fixed to the shank of said element inwardly of and adjacent said rounded part for limiting movement of the first named plate on said shank.

References Cited in the file of this patent

UNITED STATES PATENTS

| | | |
|---|---|---|
| 332,715 | Hoyt | Dec. 22, 1885 |
| 334,055 | Shaw | Jan. 12, 1886 |
| 810,078 | Parfitt | Jan. 16, 1906 |
| 842,641 | Fernau | Jan. 29, 1907 |
| 869,327 | Park | Oct. 29, 1907 |
| 1,017,036 | Blake | Feb. 13, 1912 |
| 2,592,791 | Coberly | Apr. 15, 1952 |
| 2,629,910 | Imparato | Mar. 3, 1953 |
| 2,695,768 | Lucker | Nov. 30, 1954 |
| 2,729,064 | Kennedy et al. | Jan. 3, 1956 |
| 2,761,582 | Moore | Sept. 4, 1956 |
| 2,850,304 | Wagner | Sept. 2, 1958 |
| 2,853,114 | Barry | Sept. 23, 1958 |

FOREIGN PATENTS

| | | |
|---|---|---|
| 715,432 | France | Sept. 28, 1931 |
| 768,214 | France | Oct. 2, 1934 |